United States Patent
Amanullah et al.

(10) Patent No.: US 11,299,661 B2
(45) Date of Patent: *Apr. 12, 2022

(54) WATER-BASED DRILLING FLUIDS THAT INCLUDE LUBRICANTS

(71) Applicant: Saudi Arabian Oil Company, Dhahran (SA)

(72) Inventors: Md Amanullah, Dhahran (SA); Jothibasu Ramasamy, Dhahran (SA); Ali Radhwan, Qatif (SA)

(73) Assignee: Saudi Arabian Oil Company, Dhahran (SA)

( * ) Notice: Subject to any disclaimer, the term of this patent is extended or adjusted under 35 U.S.C. 154(b) by 151 days.

This patent is subject to a terminal disclaimer.

(21) Appl. No.: 16/524,724

(22) Filed: Jul. 29, 2019

(65) Prior Publication Data
US 2021/0032524 A1    Feb. 4, 2021

(51) Int. Cl.
*C09K 8/22* (2006.01)
*C09K 8/16* (2006.01)
*E21B 21/00* (2006.01)

(52) U.S. Cl.
CPC .......... *C09K 8/22* (2013.01); *C09K 8/16* (2013.01); *E21B 21/00* (2013.01); *E21B 21/003* (2013.01); *C09K 2208/34* (2013.01)

(58) Field of Classification Search
CPC ...................................................... C09K 8/06
See application file for complete search history.

(56) References Cited

U.S. PATENT DOCUMENTS

| 4,802,998 A | 2/1989 | Mueller et al. |
| 4,964,615 A | 10/1990 | Mueller et al. |
| 5,260,268 A | 11/1993 | Forsberg et al. |

(Continued)

FOREIGN PATENT DOCUMENTS

| EP | 770661 A1 | 5/1997 |
| WO | 2010065634 A2 | 6/2010 |

(Continued)

OTHER PUBLICATIONS

U.S. Office Action dated Aug. 18, 2020 pertaining to U.S. Appl. No. 16/524,742, filed Jul. 29, 2019, 24 pgs.

(Continued)

*Primary Examiner* — William D Hutton, Jr.
*Assistant Examiner* — Avi T Skaist
(74) *Attorney, Agent, or Firm* — Dinsmore & Shohl LLP

(57) ABSTRACT

One or more embodiments presently described are directed to drilling fluid compositions that include lubricants, methods for making drilling fluids, and methods for drilling subterranean wells utilizing the drilling fluids. According to one embodiment, a drilling fluid composition may include a base fluid including water, a weighting agent in an amount of from 0.1 weight percent (wt. %) to 75 wt. % relative to the total weight of the water-based drilling fluid, and a lubricant in an amount of from 1 wt. % to 10 wt. % relative to the total weight of the water-based drilling fluid. The lubricant may include one or more alkyl esters and a fatty acid blend including at least palmitic acid and stearic acid. The sum of the weight percent of the palmitic acid and stearic acid may be at least 50 wt. % of the fatty acid blend.

22 Claims, 1 Drawing Sheet

(56) References Cited

U.S. PATENT DOCUMENTS

| | | | |
|---|---|---|---|
| 5,318,956 | A | 6/1994 | Mueller et al. |
| 5,593,954 | A | 1/1997 | Malchow, Jr. |
| 5,618,780 | A * | 4/1997 | Argillier .............. C10M 169/04 |
| | | | 508/503 |
| 5,707,940 | A | 1/1998 | Bush et al. |
| 5,834,533 | A | 11/1998 | Patel et al. |
| 5,977,031 | A | 11/1999 | Patel |
| 6,716,799 | B1 | 4/2004 | Mueller et al. |
| 6,806,235 | B1 | 10/2004 | Mueller et al. |
| 8,563,482 | B2 | 10/2013 | Amanullah |
| 9,834,718 | B2 | 12/2017 | Amanullah et al. |
| 2004/0002427 | A1 | 1/2004 | Goncalves et al. |
| 2004/0242908 | A1 | 12/2004 | Jennings et al. |
| 2010/0258307 | A1 | 10/2010 | Muller et al. |
| 2012/0071369 | A1 | 3/2012 | Amanullah |
| 2013/0130942 | A1* | 5/2013 | Dobson, Jr ............ C09K 8/035 |
| | | | 507/116 |
| 2013/0203636 | A1 | 8/2013 | Xiang et al. |
| 2015/0159071 | A1 | 6/2015 | Massey et al. |
| 2015/0166866 | A1 | 6/2015 | Dobson, Jr. et al. |
| 2015/0322325 | A1 | 11/2015 | Amanullah et al. |
| 2016/0002522 | A1 | 1/2016 | Gaertner et al. |
| 2017/0137689 | A1 | 5/2017 | Deroo |
| 2017/0233627 | A1 | 8/2017 | Noles, Jr. et al. |
| 2018/0168149 | A1 | 6/2018 | Jones, Jr. |
| 2018/0273833 | A1 | 9/2018 | Johnson |
| 2019/0136112 | A1 | 5/2019 | Gupta et al. |

FOREIGN PATENT DOCUMENTS

| | | | |
|---|---|---|---|
| WO | 2013078374 | A1 | 5/2013 |
| WO | 2017027431 | A1 | 2/2017 |
| WO | 2017176244 | A1 | 10/2017 |

OTHER PUBLICATIONS

International Search Report and Written Opinion dated Aug. 26, 2020 pertaining to International application No. PCT/US2020/033032 filed May 15, 2020, 12 pgs.

International Search Report and Written Opinion dated Sep. 17, 2020 pertaining to International application No. PCT/US2020/036759 filed Jun. 9, 2020, 15 pgs.

Office Action dated Jan. 29, 2021 pertaining to U.S. Appl. No. 16/524,742, filed Jul. 29, 2019, 21 pgs.

Office Action dated Apr. 5, 2021 pertaining to U.S. Appl. No. 16/524,785, filed Jul. 29, 2019, 18 pgs.

International Search Report and Written Opinion dated May 4, 2020 pertaining to International application No. PCT/US2019/061071 filed Nov. 13, 2019, 15 pgs.

Examination Report pertaining to Application No. GC201938826 dated Oct. 31, 2020.

Search Report pertaining to Application No. GC201938826 dated Oct. 31, 2020.

Office Action dated Dec. 22, 2020 pertaining to U.S. Appl. No. 16/524,785, filed Jul. 29, 2019, 34 pgs.

Orsavova et al., Fatty Acids compositions of vegetable oils and its contribution to dietary energy intake and dependence of cardiovascular mortality on dietary intake of fatty acids, Int. J. mol. Sci, 2015, 16, 12871-12890 (Year: 2015).

International Search Report and Written Opinion dated Apr. 8, 2020 pertaining to International application No. PCT/US2019/060253 filed Nov. 7, 2019, 15 pgs.

OFI Testing Equipment, Inc., "EP (Extreme Pressure) and Lubricity Tester" OFITE Dependable Products From People You Trust, 2015, 27 pgs.

Office Action dated May 7, 2021 pertaining to U.S. Appl. No. 16/524,764, filed Jul. 29, 2019, 48 pgs.

Parchem (Caprylic-Capric Acid Safety Data Sheet), retrieved from the Internet at <https://www.parchem.com/siteimages/Attachment/GHS%20Caprylic-Capric%20Acid%20MSDS.pdf> on May 3, 2021 (Year: 2015).

Office Action dated Jul. 8, 2021 pertaining to U.S. Appl. No. 16/524,742, filed Jul. 29, 2019, 16 pgs.

U.S. Office Action dated Aug. 18, 2021 pertaining to U.S. Appl. No. 16/524,785, filed Jul. 29, 2019, 23 pages.

U.S. Office Action dated Nov. 1, 2021 pertaining to U.S. Appl. No. 16/524,764, filed Jul. 29, 2019, 16 pages.

GCC Examination Report pertaining to Application No. GC 2020-39893 dated Sep. 27, 2021, 4 pages.

U.S. Office Action dated Jan. 20, 2022 pertaining to U.S. Appl. No. 16/524,742, filed Jul. 29, 2019, 30 pages.

U.S. Office Action dated Jan. 7, 2022 pertaining to U.S. Appl. No. 16/524,785, filed Jul. 29, 2019, 27 pages.

* cited by examiner

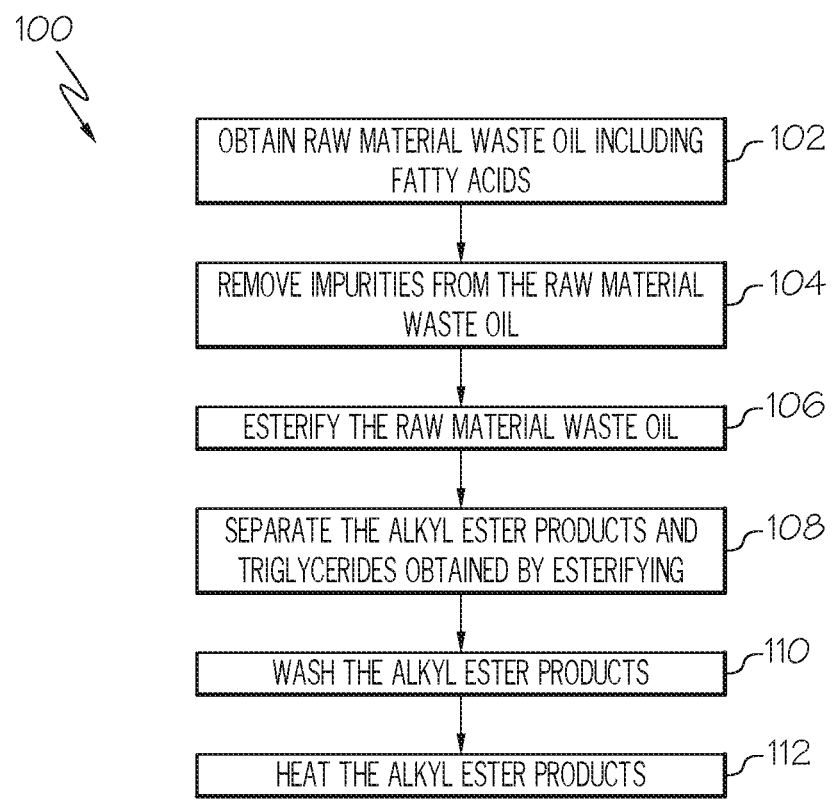

WATER-BASED DRILLING FLUIDS THAT INCLUDE LUBRICANTS

TECHNICAL FIELD

Embodiments of the present disclosure generally relate to materials and methods utilized in natural resource wells and, more specifically, to lubricants which may be used in drilling operations.

BACKGROUND

Drilling operations, for example, drilling a new wellbore for hydrocarbon extraction, may include the practice of continuously circulating a drilling fluid (alternatively known as a drilling mud) through the wellbore during the operation. The drilling fluid may be pumped into the drill pipe to the bottom of the borehole, where the drilling fluid then flows upwardly through an annular space between the wellbore wall and the drill pipe and finally returns to the surface and flows out of the wellbore, where it may be recovered. During drilling, the drilling solids, such as portions of the drilled geological formation, may be carried by the drilling fluid from at or near the bottom of the wellbore to the surface. After its return to the surface, the drilling fluid may be mechanically or chemically treated to remove captured solids and drill cuttings from the drilling fluid before recirculation back through the wellbore.

SUMMARY

Drilling fluids are used in various drilling applications, such as rotary drilling and coiled tube drilling applications, to complete functional tasks and ensure that the drilling operation is safe and economical. One objective of a drilling fluid may be the reduction of friction between the drill string and the casing or the borehole wall by acting as a lubricating medium between the metal-metal interface and the metal-mudcake interface while drilling. Some conventional water-based drilling fluids may have poor lubricating properties and, thus, may have a much greater coefficient of friction compared to oil-based drilling fluid systems. This is one of the major technical limitations of water-based drilling fluid systems compared to oil-based drilling fluid systems. To minimize the frictional resistance or coefficient of friction value of water-based drilling fluids, lubricating additives may be incorporated in the drilling fluid systems. However, many of these conventional materials have limitations in their applications. Some of the conventional lubricants have limited capacity to reduce the coefficient of friction of drilling fluids in downhole operations, some lack the requisite thermal and chemical stability, and some are poorly biodegradable, toxic, or not "ecologically-friendly" and, as such, have restricted applications for ecologically sensitive environments. Some conventional lubricants have shown a lack of oxidative stability. Additionally, some conventional lubricants lack ability to reduce the coefficient of friction of drilling fluids that comprise monovalent or divalent salts. For example, many conventional lubricants have displayed a capacity to reduce the coefficient of friction of some drilling fluids, such as a bentonite mud, while being ineffective to reduce the coefficient of friction of other drilling fluids, such as a KCl-Polymer mud.

As such, there are ongoing needs for water-based drilling fluid systems with lubricating additives that may, for example, reduce the coefficient of friction of a broad range of drilling fluids while minimizing negative impact to the surrounding environment. One or more embodiments of the present disclosure include water-based drilling fluid systems that include a lubricant that includes a fatty acid blend and an alkyl ester. The disclosed water-based drilling fluid systems with the lubricant have improved stability, improved lubrication properties, and ecologically-friendly qualities when compared to water-based drilling fluids without lubricants and water-based drilling fluid systems incorporating conventional lubricants.

According to one or more embodiments, a water-based drilling fluid may comprise a base fluid comprising water, a weighting agent in an amount of from 0.1 weight percent (wt. %) to 75 wt. % relative to the total weight of the water-based drilling fluid, and a lubricant in an amount of from 1 wt. % to 10 wt. % relative to the total weight of the water-based drilling fluid. The lubricant may comprise one or more alkyl esters and a fatty acid blend comprising at least palmitic acid and stearic acid. The sum of the weight percent of the palmitic acid and stearic acid may be at least 50 wt. % of the fatty acid blend.

According to another embodiment, a water-based drilling fluid may be made by a method comprising mixing a base fluid, a weighting agent in an amount of from 0.1 wt. % to 75 wt. % relative to the total weight of the water-based drilling fluid, and a lubricant in an amount of from 1 wt. % to 10 wt. % relative to the total weight of the water-based drilling fluid. The base fluid may comprise water. The lubricant may comprise one or more alkyl esters and a fatty acid blend comprising at least palmitic acid and stearic acid. The sum of the weight percent of the palmitic acid and stearic acid may be at least 50 wt. % of the fatty acid blend.

According to yet another embodiment, a subterranean well may be drilled by a method comprising operating a drill in a wellbore in the presence of the water-based drilling fluid. The water-based drilling fluid may comprise a base fluid comprising water, a weighting agent in an amount of from 0.1 wt. % to 75 wt. % relative to the total weight of the water-based drilling fluid, and a lubricant in an amount of from 1 wt. % to 10 wt. % relative to the total weight of the water-based drilling fluid. The lubricant may comprise one or more alkyl esters and a fatty acid blend comprising at least palmitic acid and stearic acid. The sum of the weight percent of the palmitic acid and stearic acid may be at least 50 wt. % of the fatty acid blend.

Additional features and advantages of the described embodiments will be set forth in the detailed description which follows, and in part will be readily apparent to those skilled in the art from that description or recognized by practicing the described embodiments, including the detailed description which follows and the claims.

BRIEF DESCRIPTION OF THE DRAWINGS

The following detailed description of specific embodiments of the present disclosure can be best understood when read in conjunction with the following drawing in which:

FIG. 1 depicts a flowchart of an example process of producing one or more alkyl esters from a vegetable oil source, according to one or more embodiments described in this disclosure.

Reference will now be made in greater detail to various embodiments, some embodiments of which are illustrated in the accompanying drawing.

DETAILED DESCRIPTION

Embodiments of the present disclosure are directed to lubricants for water-based drilling fluids and, additionally, to water-based drilling fluids incorporating the disclosed lubricants. The water-base drilling fluid may include at least a base fluid comprising water, a weighting agent in an amount of from 0.1 wt. % to 75 wt. % relative to the total weight of the water-based drilling fluid, and a lubricant in an amount of from 1 wt. % to 10 wt. % relative to the total weight of the water-based drilling fluid. The lubricant may include one or more alkyl esters and a fatty acid blend comprising at least palmitic acid and stearic acid, where the sum of the weight percent of the palmitic acid and stearic acid is at least 50 wt. % of the fatty acid blend. As presently described, the fatty acid blend includes all fatty acids in the lubricant, and sometimes all of the fatty acids in the drilling fluid into which the lubricant may be incorporated. Embodiments of the presently disclosed water-based drilling fluid may be formulated to provide improved lubricity. Specifically, the disclosed water-based drilling fluids may include lubricants that may be formulated to comprise a fatty acid blend in addition to alkyl esters. This formulation may comprise, in one or more embodiments, the same or a reduced coefficient of friction when compared to conventional lubricants suitable for water-based drilling fluids, while also being suitable for water-based drilling fluids that contain monovalent or divalent salts.

In one or more embodiments, the water-based drilling fluid may include a base fluid. The base fluid of the water-based drilling fluid may include water. In one or more embodiments, the water includes one or more of deionized, tap, distilled, or fresh waters; natural, brackish, or saturated salt waters; natural, salt dome, hydrocarbon formation produced, or synthetic brines; filtered or untreated sea waters; mineral waters; or potable and non-potable waters containing one or more of dissolved salts, minerals, or organic materials. The base fluid of the water-based drilling fluid may additionally include, for example, a salt. In one or more embodiments, the base fluid may include a salt brine that includes water and a salt chosen from one or more of calcium chloride, calcium bromide, sodium chloride, sodium bromide, or combinations of these. The water-based drilling fluid may include from 25 wt. % to 99 wt. % base fluid, based on the total weight of the water-based drilling fluid. In one or more embodiments, the water-based drilling fluid may include from 25 wt. % to 95 wt. %, from 25 wt. % to 75 wt. %, from 25 wt. % to 50 wt. %, from 25 wt. % to 35 wt. %, from 35 wt. % to 99 wt. %, from 35 wt. % to 95 wt. %, from 35 wt. % to 75 wt. %, from 35 wt. % to 50 wt. %, from 50 wt. % to 99 wt. %, from 50 wt. % to 95 wt. %, from 50 wt. % to 75 wt. %, from 75 wt. % to 99 wt. %, from 75 wt. % to 95 wt. %, or from 95 wt. % to 99 wt. % base fluid, such as one or a mixture of any of the presently described water-based substances, based on the total weight of the water-based drilling fluid.

In one or more embodiments, the water-based drilling fluid may include a weighting agent. The weighting agent may increase the weight, the density, or both, of the water-based drilling fluid. Weighting agents may be used to control formation pressures, to help combat the effects of sloughing or heaving shales that may be encountered in stressed areas, or a combination of these. Substances that are denser than water and that do not generally have an adverse effect on other properties of the drilling fluid may be used as a weighting agent. In one or more embodiments, the weighting agent may be a particulate solid having a specific gravity of greater than 1, which may be sufficient to increase the density of the drilling fluid composition by a certain amount without adding excessive mass such that the water-based drilling fluid cannot be efficiently circulated through the wellbore. The weighting agent may have a density of from 2 grams per cubic centimeter ($g/cm^3$) to 6 $g/cm^3$. Examples of weighting agents include barite ($BaSO_4$), galena (PbS), hematite ($Fe_2O_3$), magnetite ($Fe_3O_4$), manufactured iron oxide, ilmenite ($FeO.TiO_2$), siderite ($FeCO_3$), celestite ($SrSO_4$), dolomite ($CaCO_3.MgCO_3$), and calcite ($CaCO_3$). These example weighting agents may be used alone or in combination with one another.

In one or more embodiments, the water-based drilling fluid may include an amount of weighting agent sufficient to increase the density of the water-based drilling fluid to allow the water-based drilling fluid to support the wellbore and prevent fluids in downhole formations from flowing into the wellbore. The water-based drilling fluid may include from 0.1 wt. % to 75 wt. % weighting agent based on the total weight of the water-based drilling fluid. In one or more embodiments, the water-based drilling fluid may include 0.1 wt. % to 60 wt. %, from 0.1 wt. % to 50 wt. %, from 0.1 wt. % to 40 wt. %, from 0.1 wt. % to 30 wt. %, from 0.1 wt. % to 20 wt. %, from 0.1 wt. % to 10 wt. %, from 0.1 wt. % to 5 wt. %, from 0.1 wt. % to 1 wt. %, from 1 wt. % to 75 wt. %, from 1 wt. % to 60 wt. %, from 1 wt. % to 50 wt. %, from 1 wt. % to 40 wt. %, from 1 wt. % to 30 wt. %, from 1 wt. % to 20 wt. %, from 1 wt. % to 10 wt. %, from 1 wt. % to 5 wt. %, from 5 wt. % to 75 wt. %, from 5 wt. % to 60 wt. %, from 5 wt. % to 50 wt. %, from 5 wt. % to 40 wt. %, from 5 wt. % to 30 wt. %, from 5 wt. % to 20 wt. %, from 5 wt. % to 10 wt. %, from 10 wt. % to 75 wt. %, from 10 wt. % to 60 wt. %, from 10 wt. % to 50 wt. %, from 10 wt. % to 40 wt. %, from 10 wt. % to 30 wt. %, from 10 wt. % to 20 wt. %, from 20 wt. % to 75 wt. %, from 20 wt. % to 60 wt. %, from 20 wt. % to 50 wt. %, from 20 wt. % to 40 wt. %, from 20 wt. % to 30 wt. %, from 30 wt. % to 75 wt. %, from 30 wt. % to 60 wt. %, from 30 wt. % to 50 wt. %, from 30 wt. % to 40 wt. %, from 40 wt. % to 75 wt. %, from 40 wt. % to 60 wt. %, from 40 wt. % to 50 wt. %, from 50 wt. % to 75 wt. %, from 50 wt. % to 60 wt. %, or from 60 wt. % to 75 wt. % weighting agent based on the total weight of the water-based drilling fluid. In one or more embodiments, the weight ratio of the weighting agent to the base fluid may be from 10:100 to 300:100. For example, the weight ratio of the weighting agent to the base fluid may be from 10:100 to 200:100, from 10:100 to 100:100, from 10:100 to 75:100, from 10:100 to 50:100, from 10:100 to 25:100, from 25:100 to 300:100, from 25:100 to 200:100, from 25:100 to 100:100, from 25:100 to 75:100, from 25:100 to 50:100, from 50:100 to 300:100, from 50:100 to 200:100, from 50:100 to 100:100, from 50:100 to 75:100, from 75:100 to 300:100, from 75:100 to 200:100, from 75:100 to 100:100, from 100:100 to 300:100, from 100:100 to 200:100, or from 200:100 to 300:100 depending on the desired density of the final water-based drilling fluid.

In one or more embodiments, the water-based drilling fluid may include a lubricant. Lubricants may be used to increase the lubricity of the water-based drilling fluid, decrease friction between the drill string and the wellbore during drilling operations, or both. A reduction in the coefficient of friction of the water-based drilling fluid containing the lubricant may provide a reduction in friction experienced between the drilling components and the wellbore, such as the drill string and the wellbore. The coefficient of friction may be measured in accordance with a standard lubricity coefficient test. A lubricity testing device commonly used by those in the drilling fluid industry (for example, OFI Testing Equipment, Inc. (OFITE), Houston, Tex.) may be utilized for measuring the coefficient of friction. The water-based drilling fluid may comprise a coefficient of friction of from 0.01 to 0.10. In one or more embodiments, the water-based drilling fluid may comprise a coefficient of friction of from 0.01 to 0.09, from 0.01 to 0.08, from 0.01 to 0.07, from 0.01 to 0.06, from 0.01 to 0.05, from 0.01 to 0.04, from 0.01 to 0.03, from 0.01 to 0.02, from 0.02 to 0.10, from 0.03 to 0.10, from 0.04 to 0.10, from 0.05 to 0.10, from 0.05 to 0.10, from 0.06 to 0.10, from 0.07 to 0.10, from 0.08 to 0.10, or from 0.09 to 0.10.

In one or more embodiments, the lubricant may include at least one or more alkyl esters. The alkyl esters may be derived from saturated free fatty acids, mono-unsaturated free fatty acids, polyunsaturated fatty acids, or combinations of these. It should be understand that "derived from" may mean that the alkyl esters are those formed from the transesterification of fatty acids in the presence of alcohols. In one or more embodiments, the alkyl esters may be derived from fatty acids that include molecules from 16 carbon atoms to 20 carbon atoms. For example, the alkyl esters may be derived from fatty acids that include molecules from 16 carbon atoms to 19 carbon atoms, from 16 carbon atoms to 18 carbon atoms, from 16 carbon atoms to 17 carbon atoms, from 17 carbon atoms to 20 carbon atoms, from 18 carbon atoms to 20 carbon atoms, or from 19 carbon atoms to 20 carbon atoms. The alkyl esters may be derived from fatty acids in the presence of a short chain alcohol. In one or more embodiments, the alkyl esters may be derived from fatty acids in the presence of at least one or more of methanol, ethanol, propanol, butanol, or combinations of them.

Without being bound by theory, the alkyl esters may serve multiple functions in the lubricant. For example, the alkyl esters may improve the total lubricating efficiency of the water-based drilling fluid by reducing the coefficient of friction of the water-based drilling fluid. The alkyl esters may also improve the pour point of the water-based drilling fluid comprising the lubricant and act as an effective carrier to transport the fatty acid blend, discussed subsequently, into the interfaces of two mating surfaces present between the drilling components. The alkyl esters may also create an adsorbed surface layer on the solid surfaces of the drilling components and facilitate the distribution of the load exerted across the entire film to prevent localized concentrations of stresses.

In one or more embodiments, the alkyl esters may include plant-based alkyl esters derived from raw oil, such as a plant-based oil (for example, vegetable oil). As presently described, "raw" oil refers to the pre-esterified oil which is utilized to form the alkyl esters. Depending on the source of plants or seeds used to produce the vegetable oil, a vegetable oil may contain a mixture of different types of free fatty acids such as saturated, mono unsaturated, poly unsaturated, omega 3, omega 6, or omega 9 free fatty acids. When vegetable oil undergoes transesterification in the presence of short chain alcohols (such as methanol, ethanol, propanol, and butanol), the resulting alkyl esters are derived from the free fatty acids present in the triglycerides of the vegetable oil. In one or more embodiments, the alkyl esters may be derived from vegetable oils that may be commonly used in food preparation. Commonly used vegetable oils that may be used in food preparation include, but are not limited to, olive oil, palm oil, sunflower oil, corn oil and peanut oil.

A vegetable oil, such as that used in forming the alkyl esters, may be "fresh" or "waste" vegetable oil. In one or more embodiments, the plant-based alkyl esters may be derived from a fresh vegetable oil. "Fresh" vegetable oils, which may also be referred to as "pure vegetable oils," have not been processed or used in food preparation. In one or more embodiments, the plant-based alkyl esters may be derived from a waste vegetable oil. "Waste" vegetable oils, which may also be referred to as "used" vegetable oils, include previously fresh vegetable oils that have been used in food preparation or similarly processed. Waste vegetable oils may also be referred to as "recycled" vegetable oil when the waste vegetable oil is then further processed or used in some way. Waste vegetable oils may be used as a sustainable, inexpensive source of vegetable oil. In one or more embodiments, the water-based drilling fluid that includes the plant-based alkyl esters derived from vegetable oil may have a reduced coefficient of friction when compared to conventional water-based drilling fluids. Such water-based drilling fluids may also be environmentally-friendly as they are derived from naturally occurring oils.

In one or more embodiments, the alkyl esters may be derived from a raw oil that has a plastic viscosity of at least 50 centipoise (cP), or even at least 60.8 cP, measured using a multi-speed rotational viscometer. In some embodiments, the plastic viscosity of the raw oil to the viscosity of mineral oil (referred to as "the plastic viscosity ratio") may be at least 10. For example, the plastic viscosity ratio may be 11.18.

In one or more embodiments, the lubricant may include from 50 wt. % to 75 wt. % of alkyl esters based on the total weight of the lubricant. For example, the lubricant may include from 55 wt. % to 75 wt. %, from 60 wt. % to 75 wt. %, from 65 wt. % to 75 wt. %, from 70 wt. % to 75 wt. %, from 50 wt. % to 70 wt. %, from 50 wt. % to 65 wt. %, from 50 wt. % to 60 wt. %, or from 50 wt. % to 55 wt. % of alkyl esters based on the total weight of the lubricant.

Now referring to FIG. 1, a flowchart of an example process 100 of producing the presently described alkyl esters is depicted. In step 102, the raw material oil that includes fatty acids, such as vegetable oil, is obtained. In some implementations, the raw oil can be processed or waste vegetable oil produced as a byproduct by the food industry as described previously in this disclosure. Alternatively, the raw material oil can be pure vegetable oil.

In step 104, impurities are removed from the raw material oil. The impurities, such as food residues, can reduce the functional capability of the raw material oil. In one or more embodiments, the raw material oil can be filtered at a decreased pressure. In one or more embodiments, the raw material oil can be filtered at a pressure range of 5 pounds per square inch (PSI) to 10 PSI. For example, a reduced pressure filtration cell may be used to remove impurities, such as burnt and unburned food residue, which may be present in the waste vegetable oil. The reduced pressure filtration cell may include filter paper with pore sizes that are less than 5 microns in order to remove impurities that are larger than 5 microns. A constant pressure of 5 PSI to 10 PSI may be used on the reduced pressure cell for quick filtration of a volume of the waste vegetable oil. In one or more embodiments, impurities may be removed from the raw material oil using alternative or additional methods. For example, filtration media or adsorbents that are capable of removing impurities and excess water from waste vegetable oil can be used as alternatives or in addition to the reduced pressure filtration cell. For example, a multi-cell filtration apparatus can be used for removing the impurities.

In step 106, the raw material waste oil is esterified. In one or more embodiments, the raw material waste oil is esterified in the presence of a catalyst to produce alkyl ester products and triglycerides. In one or more embodiments, the catalyst may include at least one of sodium hydroxide, potassium hydroxide, sodium alkoxide, potassium alkoxide, or combinations of these. For example, the raw material oil can be esterified with methanol in the presence of sodium hydroxide. To do so, a volume of methanol (such as 20 volumetric percent of the original waste vegetable oil volume) and a mass of NaOH (such as 4.22 grams (g) NaOH per liter of waste vegetable oil) may be mixed in a dry condition using a magnetic stirrer and then added to the waste vegetable oil in a container. The mixture may then be stirred for six hours using the magnetic stirrer to complete the interactions. The quantity of catalyst required to process the waste vegetable oil may be determined by titration method. To do so, 1 milliliter (mL) of waste vegetable oil may be mixed with 10 mL of isopropyl alcohol of 99.2% purity. To this mixture, 2-3 drops of an indicator fluid, such as phenolphthalein, may be added. The indicator fluid is added drop by drop into the agitated waste vegetable oil until the color changes to pink. After the endpoint, the mixture is stirred to check the permanency of the pink color. The titration test is repeated three times to calculate the average amount of catalyst required to reach the endpoint. After determining the average value of sodium hydroxide (NaOH) based on the titration test results, a constant value of 3.5 g is added to determine the total amount of catalyst (for example, between 4.18 g and 4.22 g) required for 1 liter of waste vegetable oil.

In step 108, the alkyl ester products and triglycerides are separated. In some embodiments, the total reaction product from 106 may be allowed to stay in static conditions overnight to complete the sedimentation of glycerol and sludge at the bottom of the container. During the initial settling phase, if some emulsion were formed, for example, due to the presence of some emulsion forming byproducts in the ester layer, the emulsion can be broken by heating the processed mass at approximately 80° C. or adding approximately 10 mL of acetic acid per liter of waste vegetable oil to break and prevent the emulsion formation. In some embodiments, the esterified oil and the washed water may be kept in static condition overnight for effective separation of oil and water phases.

In step 110, the alkyl ester products are washed. After complete sedimentation at 108, the top clear esterified oil may be decanted slowly and washed for several hours using water while stirring with a magnetic stirrer. The separated oil phase may be decanted slowly to remove it from the water phase. In some embodiments, the process of washing may be repeated two or more times.

In step 112, alkyl ester products are heated to remove any residual water and the short chain alcohol. In some embodiments, after the final washing of 110, the washed, esterified oil may be heated to 80° C. under dynamic condition using a hot plate and a magnetic stirrer. This may remove water and methanol from the processed vegetable oil resulting in the washed and heated alkyl ester products substantially free of residual water and short chain alcohol included in esterified raw material oil. As used in this disclosure, the term "substantially free" of a component means less than 1 wt. % of that component in a particular portion of a product. As an example, the alkyl ester products, which may be substantially free of residual water and short chain alcohol included in esterified raw material oil, may have less than 1 wt. % of water and less than 1 wt. % of short chain alcohol. Implementing the previously described steps of process 100 produces washed and heated alkyl ester products that are substantially (in one or more embodiments, entirely) free of residual water, short chain alcohol, or both that may be present in esterified raw material oil. The washed and heated alkyl ester products are void of triglycerides that may be present in the esterified raw material oil.

In one or more embodiments, the lubricant also includes a fatty acid blend. The fatty acid blend may include at least palmitic acid and stearic acid. The sum of the weight percent of the palmitic acid and the stearic acid may be at least 50 wt. % of the fatty acid blend. In one or more embodiments, the sum of the weight percent of the palmitic acid and stearic acid may be from 50 wt. % to 99 wt. %, from 55 wt. % to 99 wt. %, from 60 wt. % to 99 wt. %, from 65 wt. % to 99 wt. %, from 70 wt. % to 99 wt. %, from 75 wt. % to 99 wt. %, from 80 wt. % to 99 wt. %, from 85 wt. % to 99 wt. %, from 90 wt. % to 99 wt. %, from 95 wt. % to 99 wt. %, from 50 wt. % to 95 wt. %, from 50 wt. % to 90 wt. %, from 50 wt. % to 85 wt. %, from 50 wt. % to 80 wt. %, from 50 wt. % to 75 wt. %, from 50 wt. % to 70 wt. %, from 50 wt. % to 65 wt. %, from 50 wt. % to 60 wt. %, or from 50 wt. % to 55 wt. % of the fatty acid blend. The fatty acid blend may include palmitic acid and stearic acid, in some embodiments, in a molar ratio of from 20:80 to 40:60. In one or more embodiments, the fatty acid blend may include palmitic acid and stearic acid in a molar ratio of from 21:79 to 35:65, from 22:78 to 34:66, from 23:77 to 33:67, from 24:76 to 32:68, from 25:75 to 31:69, from 23:74 to 30:70, or from 27:73 to 29:71. The fatty acid blend may also include any fatty acid that does not adversely affect other properties of the lubricant. For example, the structure of a fatty acid, such as the length of the carbon chain, may result in differences in physical properties of the lubricant such as melting point and pour point. Fatty acids which may precipitate at lower temperatures may not be suitable for use in the lubricant.

The fatty acid blend may serve a number of functions in the lubricant. The fatty acid blend may enhance the lubricant's capacity to reduce the coefficient of friction of the water-based drilling fluid. When the fatty acid blend is homogenously dispersed within the alkyl ester mixture, described previously in this disclosure, it may improve the interface penetration capacity of the lubricant to create a thin but strong lubricating film on the surfaces of the drilling components. The fatty acid blend may also increase the oxidative stability of the alkyl esters, preventing a loss of lubricating capacity when the water-based drilling fluid comprising the lubricant includes a monovalent or divalent salt.

The lubricant may include from 25 wt. % to 50 wt. % of the fatty acid blend based on the total weight of the lubricant. In one or more embodiments, the lubricant may include from 30 wt. % to 50 wt. %, from 35 wt. % to 50 wt. %, from 40 wt. % to 50 wt. %, from 45 wt. % to 50 wt. %, from 25 wt. % to 45 wt. %, from 25 wt. % to 40 wt. %, from 25 wt. % to 35 wt. %, or from 25 wt. % to 30 wt. % of the fatty acid blend based on the total weight of the lubricant.

The fatty acid may be a liquid and, in some embodiments, the lubricant may be a homogenous mixture free of solids. Solids may have the tendency to undesirably form in a lubricant including fatty acids upon addition to a water-based drilling fluid. The formation of these solids may be attributed to the inability of fatty acid to uniformly distribute in the lubricant, causing a non-homogeneous lubricant and, as a result, a non-homogenous drilling fluid. The formation of solids in the drilling fluid alters the homogeneity of the lubricant, and homogeneity may be beneficial or outright required in a lubricant. Therefore, if the lubricant contains these solids, it may not be an acceptable form of a lubricant.

In one or more embodiments, the weight ratio of the one or more alkyl esters to the fatty acid blend may be from 1:1 to 3:1. For example, the weight ratio of the one or more alkyl esters to the fatty acid blend may be from 1:1 to 2.5:1, from 1:1 to 2:1, from 1:1 to 1.5:1, from 1.5: to 2:1, from 1.5:1 to 2.5:1, from 1.5:1 to 3:1, or from 2:1 to 3:1. Such a weight ratio may ensure that the fatty acid blend remains uniformly distributed within the alkyl esters and prevent precipitation. Such a weight ratio may also ensure the liquid state of the lubricant at both warm and cold temperatures and may prevent any separation and precipitation of the fatty acid blend at colder temperatures, such as those present at an ocean bottom or the surface of a well located in a colder region.

In one or more embodiments, the water-based drilling fluid may include an amount of lubricant sufficient to decrease the coefficient of friction of the water-based drilling fluid to allow the water-based drilling fluid to produce a lubricating film in the interface of two metallic surfaces or a metallic surface and a non-metallic surface, such as the drill pipe and the borehole wall. In one or more embodiments, the decrease of the coefficient of friction mitigates the torque and drag problems encountered in horizontal or extended-reach well drilling applications. A horizontal well is a well with an inclination of generally greater than 85 degrees (°) from true vertical. Horizontal wells are drilled to enhance reservoir performance by placing a long wellbore section within the reservoir. An extended-reach well is one in which the ratio of the measured depth versus the true vertical depth is at least 2:1. In case of horizontal and extended-reach wells, an increased coefficient of friction can cause a reduction in drilling efficiency, an increase in equipment wear and pipe twist-off, a reduction in the rate of penetration, an increase in the torque and drag, or combinations of these, which can lead to various other drilling problems. An increased coefficient of friction can also limit the reach of horizontal and extended-reach wells, causing a potential barrier for drilling operations.

The water-based drilling fluid may include from 1 wt. % to 10 wt. % lubricant, based on the total weight of the water-based drilling fluid. In one or more embodiments, the water-based drilling fluid may include from 1 wt. % to 9 wt. %, from 1 wt. % to 7.5 wt. %, from 1 wt. % to 6 wt. %, from 1 wt. % to 5 wt. %, from 1 wt. % to 4 wt. %, from 1 wt. % to 3 wt. %, from 1 wt. % to 2 wt. %, from 2 wt. % to 10 wt. %, from 3 wt. % to 10 wt. %, from 4 wt. % to 10 wt. %, from 5 wt. % to 10 wt. %, from 6 wt. % to 10 wt. %, from 7 wt. % to 10 wt. %, from 8 wt. % to 10 wt. %, or from 9 wt. % to 10 wt. % lubricant, based on the total weight of the water-based drilling fluid. The weight ratio of the lubricant to the base fluid may be from 1:100 to 10:100. In one or more embodiments, the weight ratio of the lubricant to the base fluid may be from 2:100 to 10:100, from 3:100 to 10:100, from 4:100 to 10:100, from 5:100 to 10:100, from 6:100 to 10:100, from 7:100 to 10:100, from 8:100 to 10:100, from 9:100 to 10:100, from 1:100 to 9:100, from 1:100 to 8:100, from 1:100 to 7:100, from 1:100 to 6:100, from 1:100 to 5:100, from 1:100 to 4:100, from 1:100 to 3:100, or from 1:100 to 2:100.

In one or more embodiments, the water-based drilling fluid may optionally include one or more salts selected from monovalent salts, divalent salts, or combinations of these. These salts may be in addition to those present in the base fluid of the water-based drilling fluid, such as salt from salt water. Contemplated monovalent salts include, but are not limited to, sodium chloride (NaCl), potassium chloride (KCl), potassium acetate, potassium carbonate, potassium lignite, and potassium salt of partially-hydrolyzed polyacrylamide (PHPA). The divalent salts may include, but are not limited to, calcium chloride ($CaCl_2$)). Water-based drilling fluids which contain monovalent or divalent salts, such as KCl, may be used when drilling water-sensitive shales, such as hard, brittle shales. The ions, such as potassium ions ($K^+$), may attach to clay surfaces and lend stability to shale exposed to drilling fluids. The ions may also assist in holding the cuttings together and minimize their dispersion into finer particles. As clay surfaces are exposed to potassium ions, different ions, such as sodium and calcium ions, may accumulate and decrease the effectiveness of the drilling fluid. Further, some drilling fluid additives, such as the bentonite subsequently discussed in this disclosure, may have a strong affinity for certain ions and the use of such additives may be limited.

The water-based drilling fluid may include from 0.01 wt. % to 10 wt. % of one or a plurality of salts based on the total weight of the water-based drilling fluid. For example, the water-based drilling fluid may include from 1 wt. % to 10 wt. %, from 2 wt. % to 10 wt. %, from 3 wt. % to 10 wt. %, from 4 wt. % to 10 wt. %, from 5 wt. % to 10 wt. %, from 6 wt. % to 10 wt. %, from 7 wt. % to 10 wt. %, from 8 wt. % to 10 wt. %, from 9 wt. % to 10 wt. %, from 0.01 wt. % to 9 wt. %, from 0.01 wt. % to 8 wt. %, from 0.01 wt. % to 7 wt. %, from 0.01 wt. % to 6 wt. %, from 0.01 wt. % to 5 wt. %, from 0.01 wt. % to 4 wt. %, from 0.01 wt. % to 3 wt. %, from 0.01 wt. % to 2 wt. %, or from 0.01 wt. % to 1 wt. % of one or a plurality of salts based on the total weight of the water-based drilling fluid. In one or more embodiments. The weight ratio of the one or a plurality of salts to the base fluid may be from 1:100 to 10:100. For example, the weight ratio of the one or a plurality of salts to the base fluid may be from 2:100 to 10:100, from 3:100 to 10:100, from 4:100 to 10:100, from 5:100 to 10:100, from 6:100 to 10:100, from 7:100 to 10:100, from 8:100 to 10:100, from 9:100 to 10:100, from 1:100 to 9:100, from 1:100 to 8:100, from 1:100 to 7:100, from 1:100 to 6:100, from 1:100 to 5:100, from 1:100 to 4:100, from 1:100 to 3:100, or from 1:100 to 2:100.

In one or more embodiments, the water-based drilling fluid may optionally include one or a plurality of additives to enhance the properties and characteristics of the water-based drilling fluid system. The additives may include, but are not limited to, emulsifiers, fluid-loss control additives, viscosifiers (viscosity control agents), alkali compounds, friction reducers, or combinations of these. The water-based drilling fluid may also optionally include pH buffers, electrolytes, glycols, glycerols, dispersion aids, corrosion inhibitors, and defoamers.

In one or more embodiments, the water-based drilling fluid system may optionally include a viscosifier to impart non-Newtonian fluid rheology to the water-based drilling fluid system to facilitate the lifting and conveying of rock cuttings to the surface of the wellbore. According to one or more embodiments, viscosifiers may include, but are not limited to, xanthan gum polymer (XC polymer), bentonite, polyacrylamide, polyanionic cellulose, low-viscosity polyanionic cellulose (PAC-LV), or combinations of these. In additional embodiments, the water-based drilling fluid system may optionally include a friction reducing material, such as a finely ground altered calcium montmorillonite clay, commonly known as "rev dust." In further embodiments, the water-based drilling fluid system may optionally include sodium asphalt sulfonate, commercially available as SOLTEX from Chevron Phillips Chemical Company. In one or more embodiments, the water-based drilling fluid may include from 0 wt. % to 2 wt. % of additives based on the total weight of the water-based drilling fluid. For example, the water-based drilling fluid may include from 0.5 wt. % to 2 wt. %, from 0.5 wt. % to 1.5 wt. %, from 0.5 wt. % to 1 wt. %, from 1 wt. % to 2 wt. %, from 1 wt. % to 1.5 wt. %, or from 1.5 wt. % to 2 wt. % of additives based on the total weight of the water-based drilling fluid. The weight ratio of the additives to the base fluid may be from 0.01:100 to 1:100. In one or more embodiments, the weight ratio of the additives to the base fluid may be from 0.05:100 to 1:100, from 0.1:100 to 1:100, from 0.25:100 to 1:100, from 0.5:100 to 1:100, from 0.6:100 to 1:100, from 0.7:100 to 1:100, from 0.8:100 to 1:100, from 0.9:100 to 1:100, from 0.01:100 to 0.9:100, from 0.01:100 to 0.8:100, from 0.01:100 to 0.7:100, from 0.01:100 to 0.6:100, from 0.01:100 to 0.5:100, from 0.01:100 to 0.25:100, from 0.01:100 to 0.1:100, or from 0.01:100 to 0.05:100.

In one or more embodiments, the water-based drilling fluid may optionally include at least one alkalinity adjuster. In one or more embodiments, the water-based drilling fluid may optionally include at least one alkaline compound to adjust the pH of the water-based drilling fluid. Examples of alkaline compounds may include, but are not limited to, lime (calcium hydroxide or calcium oxide), soda ash (sodium carbonate), sodium hydroxide, potassium hydroxide, strong bases, or combinations of these alkaline compounds. It is noted that conjugate bases to acids with an acid dissociation constant ($pK_a$) of more than about 13 are considered strong bases. The alkaline compounds may react with gases, such as $CO_2$ or $H_2S$, encountered by the drilling fluid composition during drilling operations to prevent the gases from hydrolyzing components of the water-based drilling fluid. The water-based drilling fluid may optionally include from 0.1 wt. % to 1 wt. % of alkalinity adjusters based on the total weight of the water-based drilling fluid. In one or more embodiments, the water-based drilling fluid may include from 0.1 wt. % to 0.8 wt. %, from 0.1 wt. % to 0.6 wt. %, from 0.1 wt. % to 0.4 wt. %, from 0.1 wt. % to 0.2 wt. %, from 0.2 wt. % to 1 wt. %, from 0.2 wt. % to 0.8 wt. %, from 0.2 wt. % to 0.6 wt. %, from 0.2 wt. % to 0.4 wt. %, from 0.4 wt. % to 1 wt. %, from 0.4 wt. % to 0.8 wt. %, from 0.4 wt. % to 0.6 wt. %, from 0.6 wt. % to 1 wt. %, from 0.6 wt. % to 0.8 wt. %, or from 0.8 wt. % to 1 wt. % of alkalinity adjusters based on the total weight of the water-based drilling fluid. The weight ratio of the alkalinity adjuster to the base fluid may be from 0.01:100 to 1:100. In one or more embodiments, the weight ratio of the alkalinity adjuster to the base fluid may be from 0.05:100 to 1:100, from 0.1:100 to 1:100, from 0.25:100 to 1:100, from 0.5:100 to 1:100, from 0.6:100 to 1:100, from 0.7:100 to 1:100, from 0.8:100 to 1:100, from 0.9:100 to 1:100, from 0.01:100 to 0.9:100, from 0.01:100 to 0.8:100, from 0.01:100 to 0.7:100, from 0.01:100 to 0.6:100, from 0.01:100 to 0.5:100, from 0.01:100 to 0.25:100, from 0.01:100 to 0.1:100, or from 0.01:100 to 0.05:100.

In one or more embodiments, the water-based drilling fluid may optionally include at least one solid-phase component. Solid-phase components in the water-based drilling fluid may include, but are not limited to, the weighting agent, starch, soda ash, bentonite, lime, sodium sulfite, or combinations of these. As presently described, all of the solid-phase components together make up a total solids content of the water-based drilling fluid system. The water-based drilling fluid may have a total solids content of less than or equal to 75 wt. % based on the total weight of the water-based drilling fluid composition. In additional embodiments, the water-based drilling fluid may have a solids content of less than or equal to 50 wt. %, less than or equal to 25 wt. %, or less than or equal to 10 wt. % based on the total weight of the water-based drilling fluid.

In one or more embodiments, fluid-loss control agents may be added to the water-based drilling fluid to reduce the amount of filtrate lost from the water-based drilling fluid composition into a subsurface formation. Examples of fluid-loss control agents include organophilic (for example, amine-treated) lignite, bentonite, manufactured polymers, and thinners or deflocculants. When fluid-loss control agents are used, they may comprise from 0.5 wt. % to 3 wt. % of the water-based drilling fluid composition based on the total weight of the water-based drilling fluid. In one or more embodiments, fluid-loss control agents may comprise from 0.5 wt. % to 1.25 wt. %, from 0.75 wt. % to 2 wt. %, from 0.75 wt. % to 1.5 wt. %, from 0.75 wt. % to 1.25 wt. %, from 1 wt. % to 2 wt. %, from 1 wt. % to 1.5 wt. %, or from 1 wt. % to 1.25 wt. % of the water-based drilling fluid based on the total weight of the water-based drilling fluid. The weight ratio of the fluid-loss control agent to the base fluid may be from 0.01:100 to 1:100. In one or more embodiments, the weight ratio of the fluid-loss control agent to the base fluid may be from 0.05:100 to 1:100, from 0.1:100 to 1:100, from 0.25:100 to 1:100, from 0.5:100 to 1:100, from 0.6:100 to 1:100, from 0.7:100 to 1:100, from 0.8:100 to 1:100, from 0.9:100 to 1:100, from 0.01:100 to 0.9:100, from 0.01:100 to 0.8:100, from 0.01:100 to 0.7:100, from 0.01:100 to 0.6:100, from 0.01:100 to 0.5:100, from 0.01:100 to 0.25:100, from 0.01:100 to 0.1:100, or from 0.01:100 to 0.05:100.

Having previously described the water-based drilling fluid and lubricant according to various embodiments, illustrative methods for preparing the disclosed lubricant will now be described. The methods for preparing the lubricant may include mixing solid palmitic acid and solid stearic acid to make a solid fatty acid blend, heating the solid fatty acid blend to form a liquid fatty acid blend, mixing the liquid fatty acid blend with one or more alkyl esters to form a lubricant precursor, heating the lubricant precursor to a temperature of at least 50° C., and mechanically agitating the lubricant precursor while heating to form the drilling fluid lubricant. The heating and mechanical agitation of the lubricant precursor may aid the lubricant to be a homogenous mixture substantially free from solids. As such, the lubricant may include less than 1 wt. % of solids. The heating and mechanical agitation may allow the fatty acid blend to be uniformly distributed within the one or more alkyl esters. This uniform distribution may ensure that the fatty acid blend does not precipitate out of solution upon addition of the lubricant to the water-based drilling fluid. The uniform distribution may also allow the lubricant to provide the benefits previously discussed. In one or more embodiments, the fatty acid blend may be provided as previously described in this disclosure with regard to embodiments of the water-based drilling fluid. In one or more embodiments, the alkyl esters may be provided as previously described in this disclosure with regard to embodiments of the water-based drilling fluid. In one or more embodiments, the solid fatty acid blend may be heated to a temperature sufficient to ensure the entire blend is in a liquid state. For example, in one or more embodiments the solid fatty acid blend may be heated to a temperature of from 40° C. to 60° C., from 45° C. to 60° C., from 50° C. to 60° C., from 40° C. to 55° C., from 40° C. to 50° C., or from 40° C. to 45° C.

Having previously described the water-based drilling fluid according to various embodiments, illustrative methods for preparing the water-based drilling fluid will now be described. The methods for preparing the water-based drilling fluid may include mixing a base fluid, a weighting agent, and a lubricant in an amount of from 1 wt. % to 10 wt. % relative to the total weight of the water-based drilling fluid.

In one or more embodiments, the mixing step may optionally include adding at least one salt selected from a monovalent salt, a divalent salt, or combinations of these. In additional embodiments, the mixing step may optionally include adding at least one additive such as an alkalinity adjuster, solid-phase component, fluid-loss control agent, or combinations of these. In one or more embodiments, the salt may be provided as previously described with regard to embodiments of the water-based drilling fluid. In one or more embodiments, the fatty acid blend may be provided as previously described. In one or more embodiments, the alkyl esters may be provided as previously described. In one or more embodiments, the additives, alkalinity adjusters, solid-phase components, or fluid-loss control agents may be provided as previously described with regard to embodiments of the water-based drilling fluid.

The water-based drilling fluid of the present disclosure may be well-suited for use in drilling operations in subterranean formations. The water-based drilling fluid of the present disclosure may provide lubrication functionality for cooling and lubricating the bit and drill string in boring operations. Further, the lubricant of the present disclosure may impart enhanced lubricity to the water-based drilling fluid thereby providing increased lubrication and reduced friction between the drill string, pipe, and wellbore during drilling operations. Accordingly, embodiments of methods for drilling in a subterranean well may include providing a water-based drilling fluid composition according to any embodiments described previously. The method for drilling in a subterranean well may comprise operating a drill in a wellbore in the presence of the water-based drilling fluid. According to one or more embodiments, to drill a subterranean well, a drill string, including a drill bit and drill collars to weight the drill bit, may be inserted into a predrilled hole and rotated to cause the drill bit to cut into the rock at the bottom of the hole. The drilling operation produces rock fragments. To remove the rock fragments from the bottom of the wellbore, a drilling fluid, such as the water-based drilling fluids presently described, may be pumped down through the drill string to the drill bit. The drilling fluid cools the drill bit, provides lubrication, and lifts the rock fragments known as cuttings away from the drill bit. The drilling fluid carries the cuttings upwards as the drilling fluid is re-circulated back to the surface. At the surface, the cuttings are removed from the drilling fluid through a secondary operation, and the drilling fluid may be re-circulated back down the drill string to the bottom of the wellbore for collection of further cuttings.

Drilling fluids may serve a number of functions, with different types of drilling fluids specializing in particular functions. In one or more embodiments, the water-based drilling fluid suspends the cuttings and the weighting agent aids in transporting the cuttings to the wellbore surface with the water-based drilling fluid. Additionally, the water-based drilling fluid may absorb gases in the wellbore, such as carbon dioxide ($CO_2$), hydrogen sulfide ($H_2S$), and methane ($CH_4$), and transport them to the wellbore surface for release, sequestration, or burn-off. The water-based drilling fluid may additionally provide buoyancy to the drill string, relieving the tension on the drill string as the length of the wellbore increases. In one or more embodiments, the water-based drilling fluid also provides a cooling and lubrication functionality for cooling and lubrication of the bit and drill string utilized in boring operations. In additional embodiments, the water-based drilling fluid may also aid in controlling subsurface pressures. Specifically, the water-based drilling fluid may provide hydrostatic pressure in the wellbore to provide support to the sidewalls of the wellbore and prevent the sidewalls from collapsing and caving in on the drill string. Additionally, the water-based drilling fluid may provide hydrostatic pressure in the bore to prevent fluids in the downhole formations from flowing into the wellbore during drilling operations.

EXAMPLES

The following examples illustrate one or more additional features of the present disclosure. It should be understood that these examples are not intended to limit the scope of the disclosure or the appended claims in any manner.

Example 1: Production of Sample Drilling Fluid Compositions (Without Added Lubricant)

To compare the lubricating effect of the lubricant alone and in the presence of a monovalent or divalent salt, four water-based drilling fluids were prepared. The formulation of each water-based drilling fluid is provided in Table 1 and described in the following corresponding paragraphs.

The first water-based drilling fluid, Drilling Fluid 1, was a bentonite mud that did not contain any monovalent or divalent salts. Drilling Fluid 1 was prepared by mixing 340 mL of water, 0.25 g of soda ash, and 25 g of bentonite.

The second water-based drilling fluid, Drilling Fluid 2, was a KCl-polymer mud that contained monovalent KCl salt. Drilling Fluid 2 was prepared by mixing 335 mL of water, 0.25 g of soda ash, 5 g of bentonite, 3 g of PAC-LV, 1 g of XC polymer, and 20 g of KCl.

The third water-based drilling fluid, Drilling Fluid 3, was a low-solid, non-dispersed (LSND) mud that contained monovalent KCl salt. Drilling Fluid 3 was prepared by mixing 332 mL of water, 0.3 g of soda ash, 6 g of bentonite, 3 g of PAC-LV, 1 g of XC polymer, 20 g of KCl, 3 g of Soltex, and 1 g of sodium sulfite.

The fourth water-based drilling fluid, Drilling Fluid 4, was a divalent salt and rev dust contaminated KCl-polymer mud that contained both monovalent KCl salt and divalent $CaCl_2$ salt. Drilling Fluid 4 was prepared by mixing 335 mL of water, 0.25 g of soda ash, and 5 g of bentonite, 3 g of PAC-LV, 1 g of XC polymer, 20 g of KCl, 25 g of rev dust, and 20 g of $CaCl_2$.

TABLE 1

Formulation of Water-Based Drilling Fluid Examples

| Component | Drilling Fluid 1 | Drilling Fluid 2 | Drilling Fluid 3 | Drilling Fluid 4 |
| --- | --- | --- | --- | --- |
| Water (mL) | 340 | 335 | 332 | 335 |
| Soda Ash (g) | 0.25 | 0.25 | 0.30 | 0.25 |
| Bentonite (g) | 25 | 5 | 6 | 5 |
| PAC LV (g) | 0 | 3 | 3 | 3 |
| XC Polymer (g) | 0 | 1 | 1 | 1 |
| KCl (g) | 0 | 20 | 20 | 20 |
| REV Dust (g) | 0 | 0 | 0 | 25 |
| $CaCl_2$ (g) | 0 | 0 | 0 | 20 |
| Soltex (g) | 0 | 0 | 3 | 0 |
| Sodium Sulfite (g) | 0 | 0 | 1 | 0 |
| pH | 9.5 | 9.5 | 9.5 | 9.5 |

Drilling Fluids 1-4 were then tested for baseline coefficient of friction values without added lubricant as determined by a lubricity tester, commercially available as EP and Lubricity Tester from OFITE, by loading a portion of each drilling fluid into the lubricity tester and subjecting a test block to 150 inch-pounds of torque within the sample for 5 minutes. The results for each of these drilling fluids are provided in Table 2.

TABLE 2

Coefficient of Friction (COF) Values of Drilling Fluids 1-4

| Sample | Lubricant | Drilling Fluid | COF |
|---|---|---|---|
| A1 | None | Drilling Fluid 1 | 0.48 |
| A2 | None | Drilling Fluid 2 | 0.38 |
| A3 | None | Drilling Fluid 3 | 0.20 |
| A4 | None | Drilling Fluid 4 | 0.39 |

Example 2: Production of Alkyl Esters

To prepare the alkyl esters, the source of waste vegetable oil used was vegetable oil and cooking oil from restaurants. The waste vegetable oil was a mixture of used vegetable oils, which included, but was not limited to, corn oil, sunflower oil, palm oil, canola oil, and peanut oil.

The food and other contents present in the waste vegetable oil were then filtered off to remove the impurities from the raw material waste oil and a filtered raw material oil was produced. This filtering off step was performed by a low pressure filtration cell which removed impurities including burnt and unburned food residue that were present in the waste vegetable oil. The low pressure filtration cell utilized size 5 micrometer (μm) or less filter paper to remove any impurities that were larger than 5 μm. A constant pressure between 5 and 10 PSI was maintained on the low pressure cell for the quick filtration of the waste vegetable oil.

The raw material waste oil was then esterfied to produce alkyl ester products and triglycerides. The esterification step was performed by mixing 4.22 g of NaOH per liter of waste vegetable oil with the raw material oil in a container under dry conditions using a magnetic stirrer. The mixture was then stirred for six hours using the magnetic stirrer to complete the interactions. The total reaction product was then left under static conditions overnight to complete the sedimentation of glycerol and sludge at the bottom of the container. During the initial settling phase, if some emulsion was formed due to the presence of emulsion-forming byproducts in the ester layer, the container was heated to 80° C. or 10 mL of acetic acid per liter of raw material oil was added to the container to break and prevent the emulsion formation.

Next, the alkyl ester products and triglycerides, which were produced during the esterification step, were separated. To separate these products, after complete sedimentation, the top clear esterified oil was decanted slowly and washed for several hours using water while stirring with a magnetic stirrer. The esterified oil and the washed water where left under static conditions overnight to allow for the effective separation of the oil and water phases. The separated oil phase was decanted slowly to remove it from the water phase. This process of washing was then repeated three times.

Finally, the alkyl ester products were dried. After the final washing, the washed, esterified oil was heated to 80° C. under dynamic conditions for 12 hours using a hot plate and a magnetic stirrer to remove water and methanol further from the alkyl ester products, producing the final alkyl esters.

Example 3: Production of Fatty Acid Blend

To prepare the fatty acid blend, a solid blend of 28 wt. % of palmitic acid and 72 wt. % of stearic acid was produced. The solid blend was then heated to 50° C. on a hot plate until the blend was entirely transformed from the solid state to the liquid state.

Example 4: Production of Lubricant

The liquid fatty acid blend prepared in Example 3 was mixed with the alkyl esters prepared in Example 2 at a weight ratio of 1:2 before being heated dynamically. The mixture was stirred with a magnetic stirrer while heated to 65° C. on a hot plate. This thermo-mechanical agitation was continued until the mixture achieved homogenization, producing the lubricant.

Example 5: Production of Sample Drilling Fluid Compositions with Alkyl Esters

A sample of each of Drilling Fluids 1-4, as prepared in Example 1, were mixed with alkyl esters as prepared in Example 2. The resulting drilling fluid samples, Samples B1-B4, included 3 wt. % of the alkyl esters. The samples were then tested for coefficient of friction values determined by a lubricity tester, commercially available as EP and Lubricity Tester from OFITE, by loading a portion of each drilling fluid into the lubricity tester and subjecting a test block to 150 inch-pounds of torque within the sample for 5 minutes. The results for each of these samples are provided in Table 3.

TABLE 3

Coefficient of Friction (COF) Values of Samples B1-B4

| Sample | Lubricant | Drilling Fluid | COF |
|---|---|---|---|
| B1 | 3 wt. % Alkyl Esters | Drilling Fluid 1 | 0.09 |
| B2 | 3 wt. % Alkyl Esters | Drilling Fluid 2 | 0.36 |
| B3 | 3 wt. % Alkyl Esters | Drilling Fluid 3 | 0.15 |
| B4 | 3 wt. % Alkyl Esters | Drilling Fluid 4 | 0.37 |

Example 6: Production of Sample Drilling Fluid Compositions with Lubricant

A sample of each of Drilling Fluids 1-4, as prepared in Example 1, were mixed with the lubricant as prepared in Example 4. The resulting drilling fluid samples, Samples C1-C4, included 3 wt. % of the lubricant. The samples were then tested for coefficient of friction values determined by a lubricity tester, commercially available as EP and Lubricity Tester from OFITE, by loading a portion of each drilling fluid into the lubricity tester and subjecting a test block to 150 inch-pounds of torque within the sample for 5 minutes. The results for each of these samples are provided in Table 4.

TABLE 4

Coefficient of Friction (COF) Values of Samples C1-C4

| Sample | Lubricant | Drilling Fluid | COF |
|---|---|---|---|
| C1 | 3 wt. % Lubricant | Drilling Fluid 1 | 0.03 |
| C2 | 3 wt. % Lubricant | Drilling Fluid 2 | 0.03 |
| C3 | 3 wt. % Lubricant | Drilling Fluid 3 | 0.04 |
| C4 | 3 wt. % Lubricant | Drilling Fluid 4 | 0.04 |

Example 7: Production of Sample Drilling Fluid Compositions with Commercially Available Lubricant A sample of each of Drilling Fluids 1-4, as prepared in Example 1, were mixed with an "ecologically-friendly" lubricant suitable for use in drilling fluids, commercially available as Radiagreen® from Oleon. The resulting drilling fluid samples, Samples D1-D4, included 3 wt. % of the commercially available lubricant. The samples were then tested for coefficient of friction values determined by a lubricity tester, commercially available as EP and Lubricity Tester from OFITE, by loading a portion of each drilling fluid into the lubricity tester and subjecting a test block to 150 inch-pounds of torque within the sample for 5 minutes. The results for each of these samples are provided in Table 5.

TABLE 5

Coefficient of Friction (COF) Values of Samples C1-C4

| Sample | Lubricant | Drilling Fluid | COF |
|---|---|---|---|
| D1 | 3 wt. % Commercially Available Lubricant | Drilling Fluid 1 | 0.17 |
| D2 | 3 wt. % Commercially Available Lubricant | Drilling Fluid 2 | 0.11 |
| D3 | 3 wt. % Commercially Available Lubricant | Drilling Fluid 3 | 0.15 |
| D4 | 3 wt. % Commercially Available Lubricant | Drilling Fluid 4 | 0.15 |

Example 8: Comparison of Drilling Fluids of Examples 5-7

The results for the samples of Examples 5-7 as well as the baseline coefficient of friction values of Drilling Fluids 1-4 determined in Example 1 are provided in Table 6.

TABLE 6

Coefficient of Friction (COF) Values of Examples 5-7

| Sample | Lubricant | Drilling Fluid | COF |
|---|---|---|---|
| A1 | None | Drilling Fluid 1 | 0.48 |
| A2 |  | Drilling Fluid 2 | 0.38 |
| A3 |  | Drilling Fluid 3 | 0.20 |
| A4 |  | Drilling Fluid 4 | 0.39 |
| B1 | 3 wt. % Alkyl Esters | Drilling Fluid 1 | 0.09 |
| B2 |  | Drilling Fluid 2 | 0.36 |
| B3 |  | Drilling Fluid 3 | 0.15 |
| B4 |  | Drilling Fluid 4 | 0.37 |
| C1 | 3 wt. % Lubricant | Drilling Fluid 1 | 0.03 |
| C2 |  | Drilling Fluid 2 | 0.03 |
| C3 |  | Drilling Fluid 3 | 0.04 |
| C4 |  | Drilling Fluid 4 | 0.04 |
| D1 | 3 wt. % Commercially Available Lubricant | Drilling Fluid 1 | 0.17 |
| D2 |  | Drilling Fluid 2 | 0.12 |
| D3 |  | Drilling Fluid 3 | 0.15 |
| D4 |  | Drilling Fluid 4 | 0.15 |

As shown by the results provided in Table 6, the inclusion of 3 wt. % of alkyl esters resulted in a reduction of the coefficient of friction of Drilling Fluid 1, which contained no monovalent salt or divalent salt. However, this reduction of the coefficient of friction was dramatically reduced in Drilling Fluid 3 and negligible in Drilling Fluids 2 and 4. That is, while alkyl esters were an effective lubricant for clay-based drilling fluids, such as Drilling Fluid 1, it was ineffective in drilling fluids which contained a monovalent salt or divalent salt.

In contrast, the inclusion of 3 wt. % of the lubricant resulted in about a 90% reduction of the coefficient of friction of Drilling Fluids 1, 2, and 4 and about a 70% reduction of the coefficient of friction of Drilling Fluid 3. That is, the disclosed lubricant was an effective lubricant for both clay-based drilling fluids and drilling fluids which contained a monovalent salt or divalent salt. This observation may be attributed to the presence of the fatty acid blend in the lubricant. As discussed previously, the fatty acid blend improves the base lubricating capacity of the lubricant. This may be observed in the difference of coefficient of friction between Sample B1, which contains alkyl esters but no fatty acid blend, and Sample C1. Additionally, the fatty acid blend also increases the oxidative stability of the alkyl esters and prevents a loss of lubricating capacity in the presence of monovalent or divalent salts. This may be observed in the difference of coefficient of friction between Samples B2-B4 and Samples C2-C4.

The commercially available lubricant also displayed a greater reduction of the coefficient of friction of the drilling fluid as compared to the alkyl esters alone. However, the commercially available lubricant only displayed a maximum of about 70% reduction of the coefficient of friction of Drilling Fluids 1, 2, and 4 and about a 45% reduction of the coefficient of friction of Drilling Fluid 3. That is, commercially available lubricant was not ineffective in drilling fluids that contain a monovalent salt or divalent salt, such as the alkyl esters, but failed to achieve the effectiveness of the disclosed lubricant.

Therefore, based on the results provided in Table 6 and the previous discussion, it is evident that a lubricant which comprises both alkyl esters and a fatty acid blend of palmitic acid and stearic acid provide a greatly increased lubricating capacity and greatly reduced coefficient of friction when compared to similar lubricants.

It will be apparent to those skilled in the art that various modifications and variations can be made without departing from the spirit or scope of the disclosure. Since modifications, combinations, sub-combinations and variations of the disclosed embodiments incorporating the spirit and substance of the disclosure may occur to persons skilled in the art, the scope of the disclosure should be construed to include everything within the scope of the appended claims their equivalents.

In a first aspect of the present disclosure, a water-based drilling fluid may include a base fluid comprising water, a weighting agent in an amount of from 0.1 wt. % to 75 wt. % relative to the total weight of the water-based drilling fluid, and a lubricant in an amount of from 1 wt. % to 10 wt. % relative to the total weight of the water-based drilling fluid. The lubricant may include one or more alkyl esters and a fatty acid blend including at least palmitic acid and stearic acid. The sum of the weight percent of the palmitic acid and stearic acid may be at least 50 wt. % of the fatty acid blend.

A second aspect of the present disclosure may include the first aspect further including at least one salt selected from a monovalent salt, a divalent salt, or combinations of these.

A third aspect of the present disclosure may include the second aspect where the at least one salt may be present in an amount from 0.01 wt. % to 10 wt. % relative to the total weight of the water-based drilling fluid.

A fourth aspect of the present disclosure may include either of the second or third aspects where the at least one salt may be selected from KCl, NaCl, $CaCl_2$, or combinations of these.

A fifth aspect of the present disclosure may include any of the first through fourth aspects where the weight ratio of the one or more alkyl esters to the fatty acid blend may be from 1:1 to 3:1.

A sixth aspect of the present disclosure may include any of the first through fifth aspects where the molar ratio of palmitic acid to stearic acid may be from 20:80 to 40:60.

A seventh aspect of the present disclosure may include any of the first through sixth aspects where the one or more alkyl esters may be derived from vegetable oil.

In an eight aspect of the present disclosure, a method for making a water-based drilling fluid may include mixing a base fluid, a weighting agent in an amount of from 0.1 wt. % to 75 wt. % relative to the total weight of the water-based drilling fluid, and a lubricant in an amount of from 1 wt. % to 10 wt. % relative to the total weight of the water-based drilling fluid. The base fluid may include water. The lubricant may include one or more alkyl esters and a fatty acid blend including at least palmitic acid and stearic acid. The sum of the weight percent of the palmitic acid and stearic acid may be at least 50 wt. % of the fatty acid blend.

A ninth aspect of the present disclosure may include the eighth aspect where the mixing step further includes mixing at least one salt selected from a monovalent salt, a divalent salt, or combinations of these.

A tenth aspect of the present disclosure may include the ninth aspect where the at least one salt may be present in an amount from 0.01 wt. % to 10 wt. % relative to the total weight of the water-based drilling fluid.

An eleventh aspect of the present disclosure may include either of the ninth or tenth aspects where the at least one salt may be selected from KCl, NaCl, $CaCl_2$, or combinations of these.

A twelfth aspect of the present disclosure may include any of the eighth through eleventh aspects where the molar ratio of the solid palmitic acid to the solid stearic acid may be from 20:80 to 50:50.

A thirteenth aspect of the present disclosure may include any of the eighth through twelfth aspects where the weight ratio of the one or more alkyl esters to the liquid fatty acid blend may be from 1:1 to 3:1.

A fourteenth aspect of the present disclosure may include any of the eighth through thirteenth aspects where the one or more alkyl esters may be derived from vegetable oil.

A fifteenth aspect of the present disclosure may include any of the eighth through fourteenth aspects further including mixing solid palmitic acid and solid stearic acid to make a solid fatty acid blend, heating the solid fatty acid blend to form a liquid fatty acid blend, mixing the liquid fatty acid blend with one or more alkyl esters to from a lubricant precursor, and heating the lubricant precursor to a temperature of at least 50° C. and mechanically agitating the lubricant precursor while heating to form the lubricant.

In a sixteenth aspect of the present disclosure, a method for drilling a subterranean well may include operating a drill in a wellbore in the presence of a water-based drilling fluid. The water-based drilling fluid may include a base fluid including water, a weighting agent in an amount of from 0.1 wt. % to 75 wt. % relative to the total weight of the water-based drilling fluid, and a lubricant in an amount of from 1 wt. % to 10 wt. % relative to the total weight of the water-based drilling fluid. The lubricant may include one or more alkyl esters and a fatty acid blend including at least palmitic acid and stearic acid. The sum of the weight percent of the palmitic acid and stearic acid may be at least 50 wt. % of the fatty acid blend.

A seventeenth aspect of the present disclosure may include the sixteenth aspect where the water-based drilling fluid further includes at least one salt selected from a monovalent salt, a divalent salt, or combinations of these.

An eighteenth aspect of the present disclosure may include the seventeenth aspect where the at least one salt may be present in an amount from 0.01 wt. % to 10 wt. % relative to the total weight of the base fluid.

A nineteenth aspect of the present disclosure may include either of the seventeenth or eighteenth aspects where the at least one salt may be selected from KCl, NaCl, $CaCl_2$, or combinations of these.

A twentieth aspect of the present disclosure may include any of the sixteenth through nineteenth aspects where the weight ratio of the one or more alkyl esters to the fatty acid blend may be from 1:1 to 3:1.

A twenty-first aspect of the present disclosure may include any of the sixteenth through twentieth aspects where the molar ratio of palmitic acid to stearic acid may be from 20:80 to 40:60.

A twenty-second aspect of the present disclosure may include any of the sixteenth through twenty-first aspects where the one or more alkyl esters may be derived from vegetable oil.

It should now be understood that various aspects of the compositions and methods for acid diversion during an acid stimulation treatment of a subterranean formation are described and such aspects may be utilized in conjunction with various other aspects.

It should be understood that any two quantitative values assigned to a property may constitute a range of that property, and all combinations of ranges formed from all stated quantitative values of a given property are contemplated in this disclosure. It should be appreciated that compositional ranges of a chemical constituent in a composition or formulation should be appreciated as containing, in one or more embodiments, a mixture of isomers of that constituent. It should be appreciated that the examples supply compositional ranges for various compositions, and that the total amount of isomers of a particular chemical composition can constitute a range.

It is noted that one or more of the following claims utilize the term "where" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising."

Having described the subject matter of the present disclosure in detail and by reference to specific embodiments, it is noted that the various details described in this disclosure should not be taken to imply that these details relate to elements that are essential components of the various embodiments described in this disclosure, even in cases where a particular element is illustrated in each of the drawings that accompany the present description. Rather, the claims appended should be taken as the sole representation of the breadth of the present disclosure and the corresponding scope of the various embodiments described in this disclosure. Further, it should be apparent to those skilled in the art that various modifications and variations can be made to the described embodiments without departing from the spirit and scope of the claimed subject matter. Thus it is intended that the specification cover the modifications and variations of the various described embodiments provided such modifications and variations come within the scope of the appended claims and their equivalents.

What is claimed is:

1. A water-based drilling fluid comprising:
a base fluid comprising water;
a weighting agent in an amount of from 0.1 wt. % to 75 wt. % relative to the total weight of the water-based drilling fluid; and
a lubricant in an amount of from 1 wt. % to 10 wt. % relative to the total weight of the water-based drilling fluid, the lubricant comprising:
one or more alkyl esters; and a fatty acid blend comprising at least palmitic acid and stearic acid, where the sum of the weight percent of the palmitic acid and stearic acid is at least 50 wt. % of the fatty acid blend, and where the weight ratio of the one or more alkyl esters to the fatty acid blend is from 1:1 to 3:1, wherein the weight ratio uniformly distributes the fatty acid blend within the one or more alkyl esters so that the lubricant is in a liquid state.

2. The water-based drilling fluid of claim 1, further comprising at least one salt selected from a monovalent salt, a divalent salt, or combinations of these.

3. The water-based drilling fluid of claim 2, where the at least one salt is present in an amount from 0.01 wt. % to 10 wt. % relative to the total weight of the water-based drilling fluid.

4. The water-based drilling fluid of claim 2, where the at least one salt is selected from KCl, NaCl, $CaCl_2$), or combinations of these.

5. The water-based drilling fluid of claim 1, where the molar ratio of palmitic acid to stearic acid is from 20:80 to 40:60.

6. The water-based drilling fluid of claim 1, where the one or more alkyl esters are derived from vegetable oil.

7. The water-based drilling fluid of claim 1, wherein the lubricant comprises from 55 wt. % to 75 wt. % alkyl esters based on the total weight of the lubricant.

8. The water-based drilling fluid of claim 1, wherein the lubricant comprises:
from 55 wt. % to 75 wt. % alkyl esters based on the total weight of the lubricant; and
from 25 wt. % to 45 wt. % fatty acid blend based on the total weight of the lubricant.

9. The water-based drilling fluid of claim 8, where the molar ratio of palmitic acid to stearic acid is from 20:80 to 40:60.

10. A method for making a water-based drilling fluid, the method comprising:
mixing a base fluid, a weighting agent in an amount of from 0.1 wt. % to 75 wt. % relative to the total weight of the water-based drilling fluid, and a lubricant in an amount of from 1 wt. % to 10 wt. % relative to the total weight of the water-based drilling fluid, where:
the base fluid comprises water;
the lubricant comprises one or more alkyl esters and a fatty acid blend comprising at least palmitic acid and stearic acid;
the sum of the weight percent of the palmitic acid and stearic acid is at least 50 wt. % of the fatty acid blend; and
the weight ratio of the one or more alkyl esters to the fatty acid blend is from 1:1 to 3:1, wherein the weight ratio uniformly distributes the fatty acid blend within the one or more alkyl esters so that the lubricant is in a liquid state.

11. The method of claim 10, where the mixing step further comprises mixing at least one salt selected from a monovalent salt, a divalent salt, or combinations of these.

12. The method of claim 11, where the at least one salt is present in an amount from 0.01 wt. % to 10 wt. % relative to the total weight of the water-based drilling fluid.

13. The method of claim 11, where the at least one salt is selected from KCl, NaCl, $CaCl_2$, or combinations of these.

14. The method of claim 10, where the molar ratio of the solid palmitic acid to the solid stearic acid is from 20:80 to 50:50.

15. The method of claim 10, where the one or more alkyl esters are derived from vegetable oil.

16. The method of claim 10, further comprising:
mixing solid palmitic acid and solid stearic acid to make a solid fatty acid blend;
heating the solid fatty acid blend to form a liquid fatty acid blend;
mixing the liquid fatty acid blend with one or more alkyl esters to from a lubricant precursor; and
heating the lubricant precursor to a temperature of at least 50° C. and mechanically agitating the lubricant precursor while heating to form the lubricant.

17. A method for drilling a subterranean well, the method comprising:
operating a drill in a wellbore in the presence of a water-based drilling fluid, where the water-based drilling fluid comprises: a base fluid comprising water;
a weighting agent in an amount of from 0.1 wt. % to 75 wt. % relative to the total weight of the water-based drilling fluid; and
a lubricant in an amount of from 1 wt. % to 10 wt. % relative to the total weight of the water-based drilling fluid, the lubricant comprising:
one or more alkyl esters; and
a fatty acid blend comprising at least palmitic acid and stearic acid, where the sum of the weight percent of the palmitic acid and stearic acid is at least 50 wt. % of the fatty acid blend, and the weight ratio of the one or more alkyl esters to the fatty acid blend is from 1:1 to 3:1, wherein the weight ratio uniformly distributes the fatty acid blend within the one or more alkyl esters so that the lubricant is in a liquid state.

18. The method of claim 17, where the water-based drilling fluid further comprises at least one salt selected from a monovalent salt, a divalent salt, or combinations of these.

19. The method of claim 18, where the at least one salt is present in an amount from 0.01 wt. % to 10 wt. % relative to the total weight of the base fluid.

20. The method of claim 18, where the at least one salt is selected from KCl, NaCl, $CaCl_2$, or combinations of these.

21. The method of claim 17, where the molar ratio of palmitic acid to stearic acid is from 20:80 to 40:60.

22. The method of claim 17, where the one or more alkyl esters are derived from vegetable oil.

* * * * *